W. C. GARRETSON & E. DRAPER,
W. C. GARRETSON, assignee of himself, and E. DRAPER assignor to H. WICKHAM, Jr.
Branding Stamp.
No. 9,311. Reissued July 20, 1880.
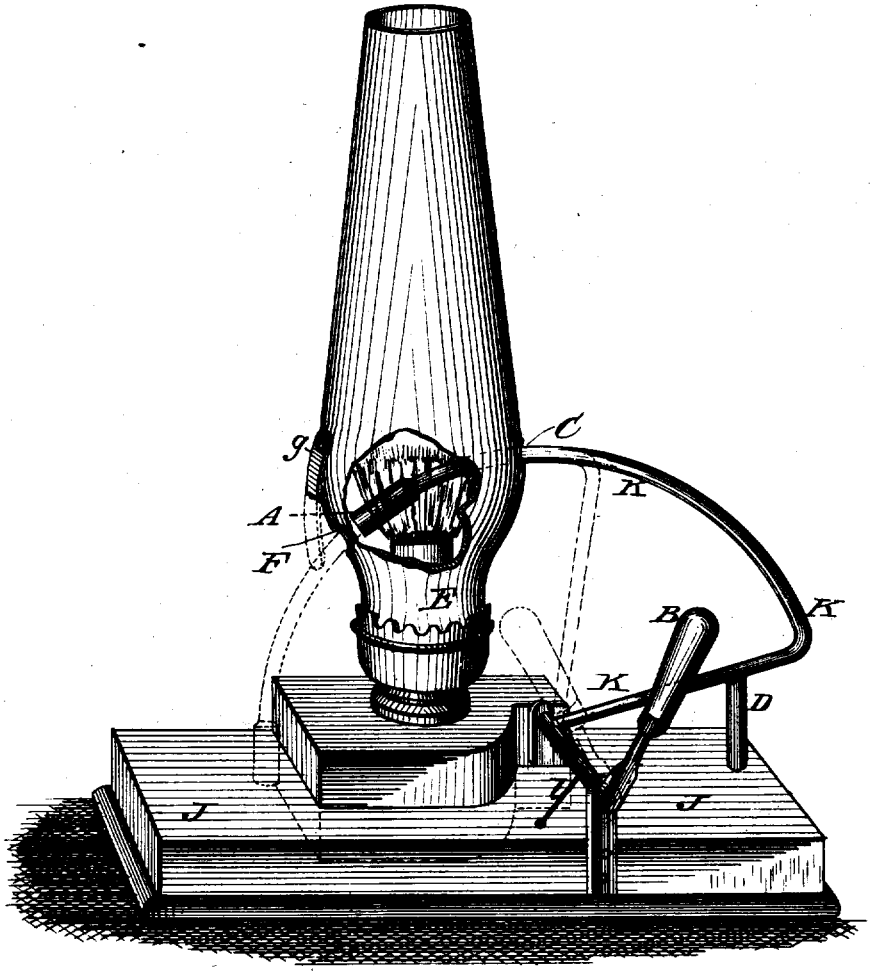
*Witnesses:*
Fred. G. Dieterich
P. C. Dieterich.
*Inventor:*
W. C. Garretson
assignee of Garretson & Draper
By Horace Wickham Jr
His Attorney
N. PETERS, PHOTO-LITHOGRAPHER, WASHINGTON, D. C.

UNITED STATES PATENT OFFICE.

W. C. GARRETSON, OF KNOXVILLE, IOWA, ASSIGNEE OF HIMSELF AND ELLWOOD DRAPER, ASSIGNOR TO HORACE WICKHAM, JR., OF CHICAGO, ILLINOIS.

BRANDING-STAMP.

SPECIFICATION forming part of Reissued Letters Patent No. 9,311, dated July 20, 1880.

Original No. 82,823, dated October 6, 1868. Application for reissue filed June 1, 1880.

*To all whom it may concern:*

Be it known that W. C. GARRETSON, of Knoxville, Marion county, and ELLWOOD DRAPER, of Oskaloosa, county of Mahaska, and State of Iowa, invented a new and useful device for canceling stamps, printing postmarks, and other similar printing by heat, said device being called "The Caloric Stamp-Canceler and Postmarker;" and I do hereby declare that the following is a full, clear, and exact description of the same, and a mode of making and operating the same, reference being had to the accompanying drawing, and to the letters of reference marked thereon, forming part of this specification.

The object of the invention is to so improve a branding-stamp that it shall be self-heating and continuous or uninterrupted in its operation, having all its parts so combined and arranged as to form substantially a single device. This object is accomplished in so combining a canceling stamp or brand with a heater and an operating-handle as to enable the stamp to be continuously or uninterruptedly used as a hand-stamp, whereby an efficient and convenient means is furnished for canceling postage or other stamps and branding post and other marks.

The accompanying drawing represents a device embodying the invention, where the flame of a lamp furnishes the heat.

A is the stamp or brand, with the postmark or whatever is desired to be printed carved or otherwise formed thereon, or type of the same material inserted therein, and should be composed of copper or some other ready conductor of heat, and may be single or double, or of any desired form.

B is a handle, by which the stamp A can be moved downward and upward.

K K K is a rod, made of one or more pieces, as desired, to which the stamp A is connected, also the handle B.

*l* is a coil-spring for the purpose of upraising the stamp A. D is a stop-pin for stopping the upward movement of the stamp A.

E represents an organized lamp, similar to lamps in common use, excepting that it is provided with a metal chimney adapted for this use.

J is a base connecting the different parts so as to form a single device. C and F are apertures, through which A and K work. *g* is a cap to close the aperture F when desired.

Operation: The lamp is lighted and the device left at rest until the stamp becomes sufficiently heated, when it is ready for continuous operation. The letter to be postmarked, the stamp to be canceled, the paper or other article to be printed is placed in a convenient position and the stamp is pressed down by bearing on the handle B. The stamp moving downward, as denoted by the dotted lines, and pressed upon the object to be printed or defaced, the impression is scorched or burned into the letter, stamp, or other object to be printed, postmarked, or canceled.

The spring *l* raises the stamp A, so as to admit of another operation; so on continuously.

I disclaim the invention of the lamp as original.

What I claim as the invention of GARRETSON and DRAPER, and desire to secure by Letters Patent, is—

1. The combination, in a handcanceling and postmarking stamp, of the actuating-handle, the die or brand connected therewith, and the burner, substantially as set forth and shown, whereby said die or brand is adapted to be heated by said burner for continuous operation in canceling or postmarking stamps and letters by the scorching action of said heated die or brand.

2. The herein-described method of canceling and postmarking stamps and letters, by subjection to the scorching action of a heated die or brand, substantially as specified.

W. C. GARRETSON,
*Assignee of Garretson and Draper.*

Witnesses:
HORACE L. WALKER,
J. W. KEEFFE.